(12) United States Patent
Zimmer

(10) Patent No.: US 6,820,302 B2
(45) Date of Patent: Nov. 23, 2004

(54) WIPER ARM COMPRISING A WIPER BLADE WHICH IS CONNECTED TO THE SAME IN AN ARTICULATED MANNER

(75) Inventor: Joachim Zimmer, Sasbach (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/399,892

(22) PCT Filed: Aug. 16, 2002

(86) PCT No.: PCT/DE02/02996

§ 371 (c)(1),
(2), (4) Date: Apr. 23, 2003

(87) PCT Pub. No.: WO03/026938

PCT Pub. Date: Apr. 3, 2003

(65) Prior Publication Data

US 2004/0006840 A1 Jan. 15, 2004

(51) Int. Cl.⁷ .................................................. B60S 1/32
(52) U.S. Cl. .............................. 15/250.32; 15/250.351; 15/250.43; 15/250.31
(58) Field of Search ....................... 15/250.32, 250.351, 15/250.44, 250.43, 250.31, 250.23

(56) References Cited

U.S. PATENT DOCUMENTS 3,123,849 A * 3/1964 O'Shei .................. 15/250.351
3,832,751 A * 9/1974 Ursel et al. .............. 15/250.23
5,729,861 A * 3/1998 Journee ................. 15/250.351
5,842,251 A * 12/1998 LeFran.cedilla.ois et al. ............................................ 15/250.04

FOREIGN PATENT DOCUMENTS

| DE | 3431936 | * | 3/1985 |
|---|---|---|---|
| DE | 3744237 | | 7/1989 |
| DE | 4406131 | * | 9/1995 |
| DE | 4436604 | | 4/1996 |
| DE | 19605428 | * | 8/1997 |
| DE | 19647347 | | 5/1998 |
| DE | 19731683 | | 1/1999 |
| DE | 19738232 | | 3/1999 |

* cited by examiner

Primary Examiner—Gary K. Graham
(74) Attorney, Agent, or Firm—Michael Best & Friedrich LLP

(57) ABSTRACT

The invention starts with a wiper arm (10) with a wiper blade (20) that is connected in an articulated manner, which includes a wiper strip support (22) and wiper strip (24) and is laterally guided vis-à-vis the wiper arm (10) by a device (28) with an elastic connecting blade (34), whereby a first end (30) of the connecting blade (34) is fixed on an articulated part (12) of the wiper arm (10). It is proposed that a second end (32) of the connecting blade (34) be fixed on the wiper blade (20) and the connecting blade (34) feature an area (40, 46, 48) that is flexible in a longitudinal direction (54).

13 Claims, 7 Drawing Sheets

WIPER ARM COMPRISING A WIPER BLADE WHICH IS CONNECTED TO THE SAME IN AN ARTICULATED MANNER

STATE OF THE ART

The invention starts with a wiper arm with a wiper blade that is connected in an articulated manner according to the pre-characterizing clause of claim 1.

Known windshield wipers have a wiper arm constructed of a fastening part and an articulated part, which is connected to the fastening part in an articulated manner and has a wiper rod. Connected to the wiper arm in an articulated manner is a wiper blade constructed of a supporting bracket system with a center bracket and possibly subordinate brackets; for example, an intermediate bracket and/or claw brackets to hold a wiper strip. The brackets are also connected with the subordinate brackets in an articulated manner so that during the rotating movement the wiper strip can adapt to a curvature in the vehicle window. Such windshield wipers are known from DE 37 44 237 A1. The joints between the brackets are normally formed by plastic parts, which simultaneously cover the front side of the profile of the higher-order bracket.

In addition, a supporting element made of an elastic, high-strength plastic for a wiper strip is known from DE 197 38 232 A1, whose supporting element has a curvature in an unloaded state that is designed so that uniform application force is produced when the wiper strip is applied completely to the vehicle window during operation of the wiper blade. Caps made of plastic are mounted on the front sides as a termination to the profile. Similar wiper blades with a supporting element made of spring steel are also known. Both a supporting bracket system as well as a supporting element in the sense described above shall be understood in the following as a wiper strip support.

Wiper blades frequently tend to vibrate during the wiping process. Especially with relatively long wiper blades, the guidance on the joint between the wiper blade the wiper arm is not sufficiently stable to prevent these vibrations. The wiper blade is incited to vibrate since a wiper blade is a slim component and because of great speed differences between the drive-side inner area and the outside area of the wiper blade that produce different friction conditions, as well as due to the stick-slip effects. This leads, particularly on the inner circle of the wiper blade where especially low friction speeds are predominant, to undesired lateral movements, which starting at a certain size can lead to the wiper blade impacting the wiper arm and causing a clattering noise. This is particularly critical if the vehicle windows are dry, dirty, iced-up not moist enough or if there is snow on the vehicle window. Since the wiper blade can then lose contact with the vehicle window in the short-term, the wiped image is also unsatisfactory. The more bracket parts the wiper blade has, the sooner it tends to rattle. In addition, light wiper blades with low spring rigidity behave less favorably than others.

In addition, a device to guide the wiper blade is known from DE 197 31 683 A1, which has a first and a second part. It is arranged in the area of the coupling location of the claw bracket and permanently connected with the articulated part of the wiper arm via, for example, adhesion, welding, soldering clipping, clamping, etc.,. The first part of the device has guide cheeks which, with respect to the wiper arm, grip around the articulated location of the claw bracket and guide. The second part also has guide cheeks, between which the first part is guided in a telescoping manner so that its guide cheeks can be held briefly and a collision with the vehicle window is not to be feared even when the vehicle window has a strong curvature. The first part is appropriately connected with the device so that it is secure from loss, for example, via a flexible element.

The second part can also be composed of a spring tongue, which connects the first part to the device so that the first part is rigidly guided in the movement direction of the windshield wiper while it can give way vis-à-vis the wiper arm, perpendicular to the vehicle window. Naturally, it is also possible to select a combination of a spring tongue and guide cheeks as a second part, whereby the spring tongue can assume the function of the flexible element. In addition, the device can be manufactured and composed of individual sheet metal parts, but it is preferable that it be composed of a plastic injection molded part made of a suitable plastic. In any case, additional components are required to guide the wiper blade, whereby increased expenditures for fabrication and assembly, and additional material costs are incurred. An air gap is normally provided between the guide surfaces of the device in order to prevent the joint between the wiper blade and the wiper arm from jamming due to wiper-arm geometry that is influenced by tolerances such as right angles on the wiper rod. Clattering noise can also occur in this case, because, though the lateral vibrations are strongly diminished, they are not avoided completely.

ADVANTAGES OF THE INVENTION

According to the invention, a second end of the connecting blade is fixed on the wiper blade and the connecting blade features an area that is flexible in the longitudinal direction. Fixing the connecting blade on both ends, namely first to the wiper arm, and secondly to the wiper blade, results in guidance between the wiper arm and wiper blade that is free of play, which is especially suitable for flat windshield wipers. In this connection, the wiper arm can run above the wiper blade or laterally offset from it.

The area of the connecting blade that is flexible in the longitudinal direction makes it possible that, with relative movements between the wiper arm and the wiper blade, the connecting blade can give way in the longitudinal direction and thereby create a required longitudinal compensation for the relative stroke between the wiper arm and the wiper blade. As a rule, the connecting blade is designed to be very soft in movement in a direction perpendicular to the windshield, so that the bearing forces of the wiper blade do not change noticeably. The connecting blade is embodied sufficiently rigidly parallel to the windshield, thereby yielding a good lateral guidance of the wiper blade.

In order to be able to assemble and disassemble the wiper blade simply, it is advisable that the connecting blade be fixed detachably to the wiper arm or the wiper blade at least on one end. The other end can be permanently connected to the respective component. Thus, for example, the connecting blade can be welded, soldered or adhered into one end in a U-shaped profile of the articulated part of the wiper arm, while the other end is connected to the wiper blade, particularly the wiper strip support, via two coupling parts that engage with one another. It is advantageous here for the connecting blade to feature an initial stress in the longitudinal direction in an assembled state.

The connecting blade can also be permanently connected to the wiper blade by its being formed on a plastic cap of the wiper strip support or being cast with one end in the cap via injection molding. Other permanent connections with the cap or a part of the wiper strip support are also possible. In this case, a coupling element is provided on the other end of the connecting blade, which is fixed with an adequate press fit in the U-shaped cross-sectional profile of the articulated part or cooperates with another coupling that is fastened to the wiper arm. The coupling parts on the wiper-arm side or on the wiper-blade side can be designed so that they form a ball-and-socket joint. This can compensate for angular deviations without force. The ends of the connecting blade can also be fixed by means of a clip piece on the wiper arm or the wiper blade, whereby the clip piece engages in recesses or indentations of the component with locking elements, for example in the form of noses or corresponding projections.

The connecting blade itself must have suitable elasticity. It can be fabricated of a suitable plastic, preferably one of fiber-reinforced plastic, or appropriately springy steel. The area that is flexible in the longitudinal direction, is formed in a preferable manner by an undulated area of the connecting blade, whereby the width of the connecting blade in the undulated area runs approximately parallel and/or perpendicular to the windshield. In all cases, longitudinal compensation takes place in the longitudinal direction with a relative movement between the wiper arm and the wiper blade. If the width of the connecting blade is aligned parallel to the windshield, greater flexibility is achieved in the perpendicular direction, while flexibility parallel to the windshield can be achieved with alignment perpendicular to the windshield to compensate for manufacturing tolerances. Both possibilities can be combined if the connecting blade is correspondingly limited around its longitudinal axis.

BRIEF DESCRIPTION OF THE DRAWINGS

Additional advantages are yielded from the following description of the drawing. Exemplary embodiments of the invention are depicted in the drawing. The drawing, the description and the claims contain numerous features in combination. The specialist will also consider the features individually in an appropriate manner and summarize them into other meaningful combinations.

The drawings show.

DESCRIPTION OF THE EXEMPLARY EMBODIMENTS

A wiper blade, 20, is connected in an articulated manner to a wiper arm, 10, which has an articulated part, 12, and wiper rod, 14, by a hook-shaped end, 16, of the wiper rod, 14, gripping around an articulated bolt, 18, of the wiper blade, 20. The wiper blade, 20, has a wiper strip support, 22, on which the articulated bolt, 18, is arranged, and on which a wiper strip, 24, is fastened. Provided between the wiper blade, 20, and the articulated part, 12, of the wiper arm, 10, is a device, 28, with a connecting blade, 34, whose first end, 30, is fixed on the articulated part, 12, and whose second end, 32, is fixed on the wiper blade, 20, in particular on the wiper strip support, 22. The connecting blade, 34, has an area that is flexible in the longitudinal direction, 54 (FIG. 5), in which it is undulated as least partially in the longitudinal direction. The undulated area is designated by 40 in FIG. 3.

Figure 1:
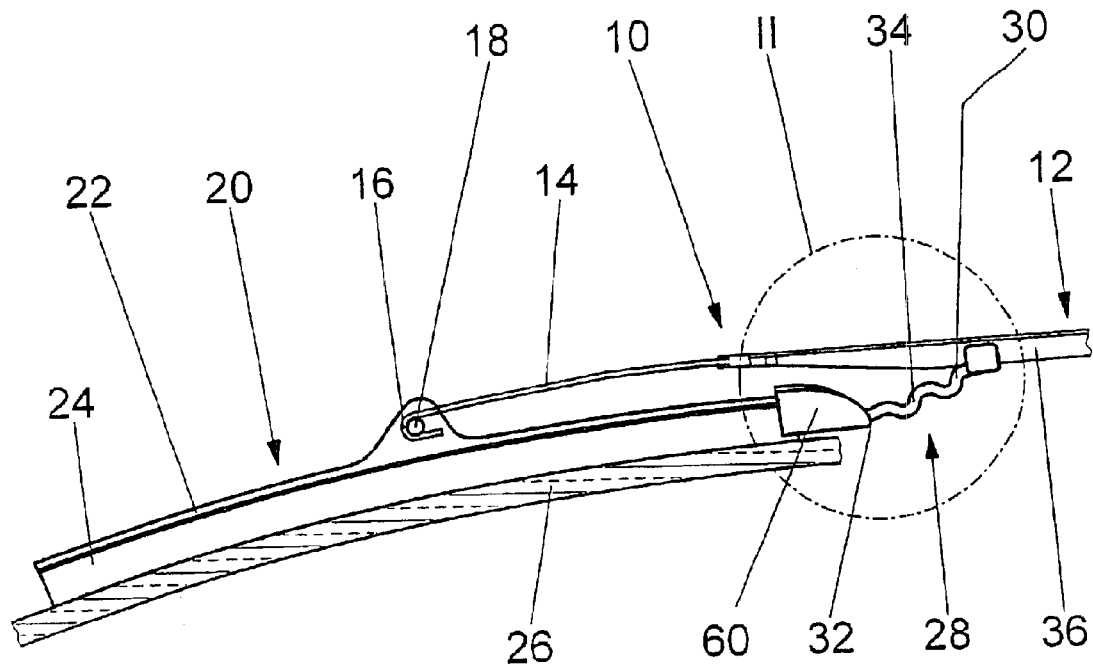
FIG. 1 A schematic side view of a wiper arm with a wiper blade that is connected in an articulated manner, FIG. 2 A detail of a device corresponding to line II in FIG. 1, FIGS. 3–11 Variations of FIG. 2, FIG. 12 A perspective partial view of an articulated part with a wiper blade from below and, FIGS. 13–17 Additional variations of FIG. 2.
Figure 2:
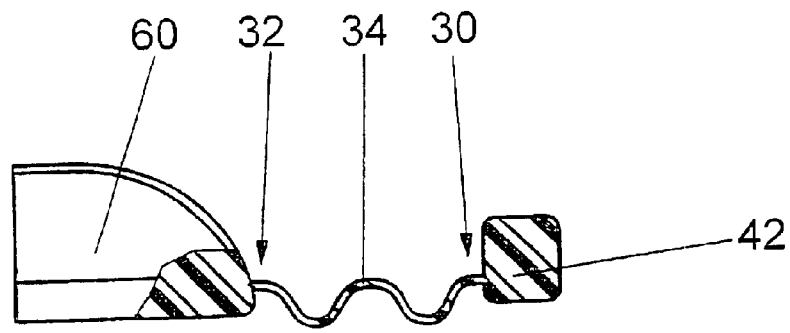

The exemplary embodiment in accordance with FIG. 2 shows a connecting blade, 34, made of plastic, which has a formed, rectangular parallelepipe-shaped coupling element, 42, on its first end, 30, which can be clamped between side cheeks, 36, in a U-shaped profile of the articulated part, 12. The second end, 32, of the connecting blade, 34, according to FIG. 2 is formed on a cap, 60, made of plastic, which is fastened on the wiper blade, 20, namely at the end of wiper strip support, 22, and the wiper strip, 24. It is also possible for a cap made of plastic to be arranged in the area of a bracket joint in the case of a supporting bracket system.

Figure 3:
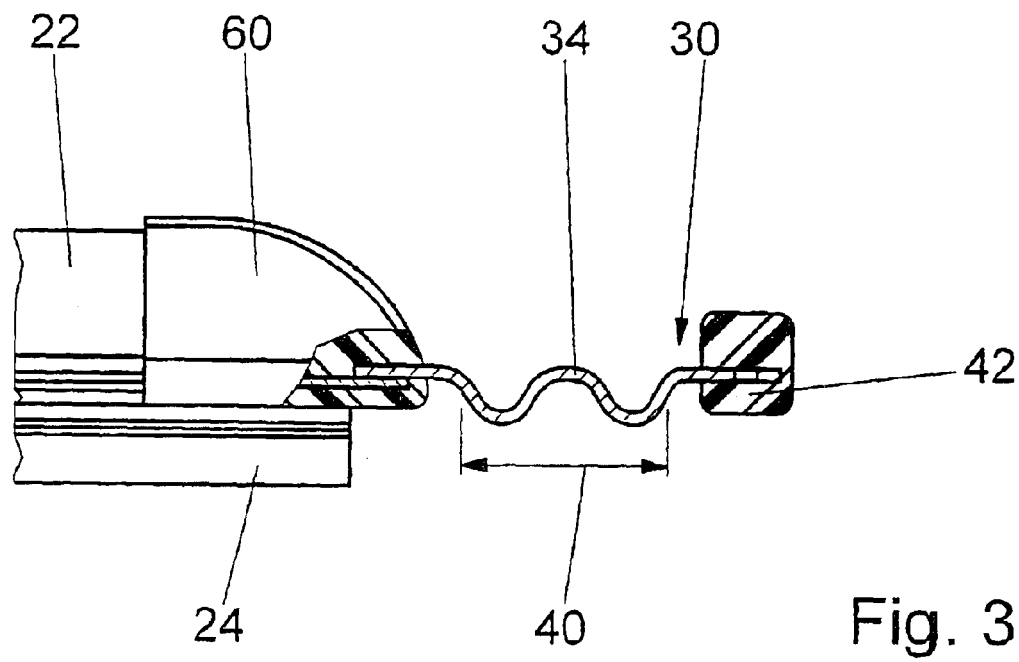
Figure 4:
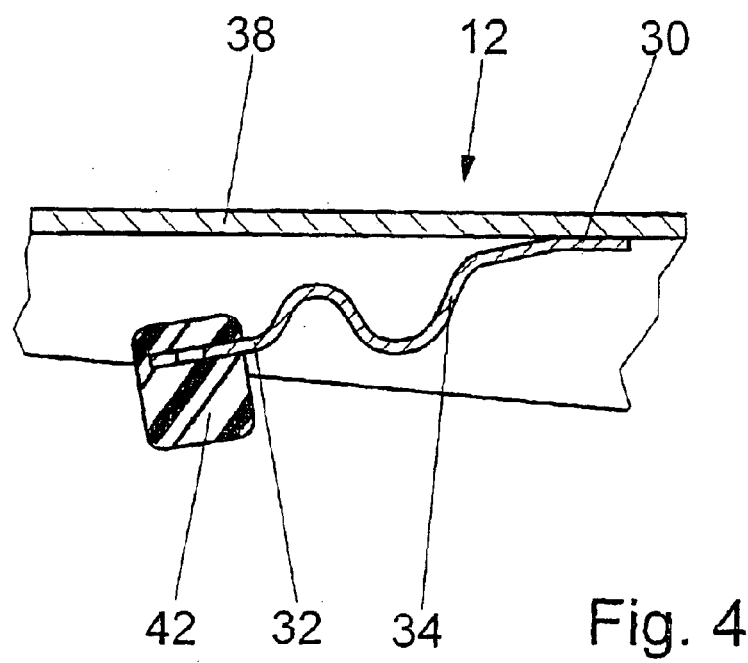

The design according to FIG. 3 differentiates itself from the design according to FIG. 2 in that the connecting blade, 34, is fabricated of a spring steel, and its ends, 30 and 32, are cast in the coupling element, 42, or in the cap, 60, made of plastic. In the case of the design according to FIG. 4, the first end, 30, of the connecting blade, 34, is fastened directly to a covering wall, 38, of the articulated part, 12, for example, by welding, soldering, adhesion etc. This type of fastening depends upon the material of which the connecting blade, 34, and the articulated part, 12, are made. In the depicted design, the connecting blade is made of spring steel and is welded to an articulated part, 12, made of sheet metal. The second end, 32, of the connecting blade, 34, is cast in a coupling element, 42.

Figure 5:
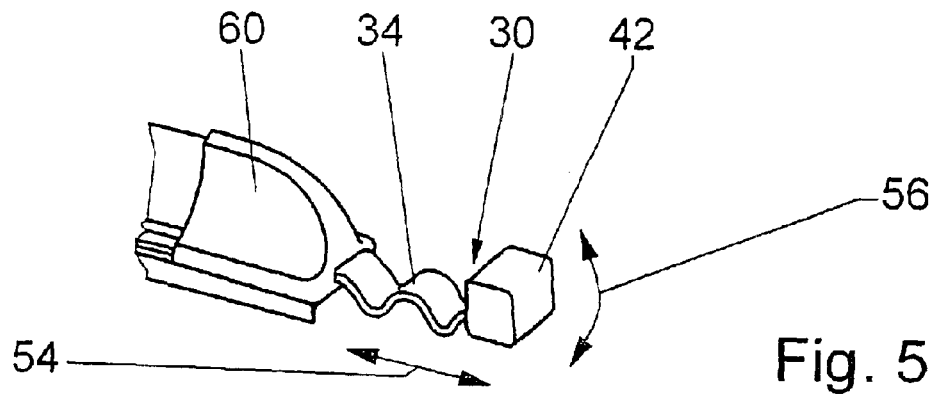

In the case of the design according to FIG. 5, the connecting blade, 34, is undulated in the longitudinal direction, 54, whereby the width of the connecting blade, 34, runs approximately parallel to the windshield, 26. In this connection, good height compensation is produced in direction, 56, and a longitudinal compensation in longitudinal direction 54.

Figure 6:
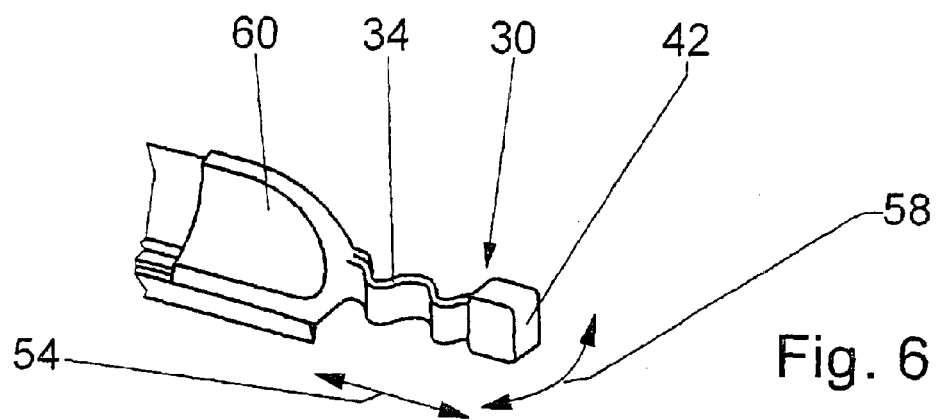

In the design according to FIG. 6, the width of the spring blade, 34, is aligned approximately perpendicular to the windshield, 26, so that, in addition to the longitudinal compensation in the longitudinal direction, 54, a lateral compensation in direction, 58, is also produced.

Figure 7:
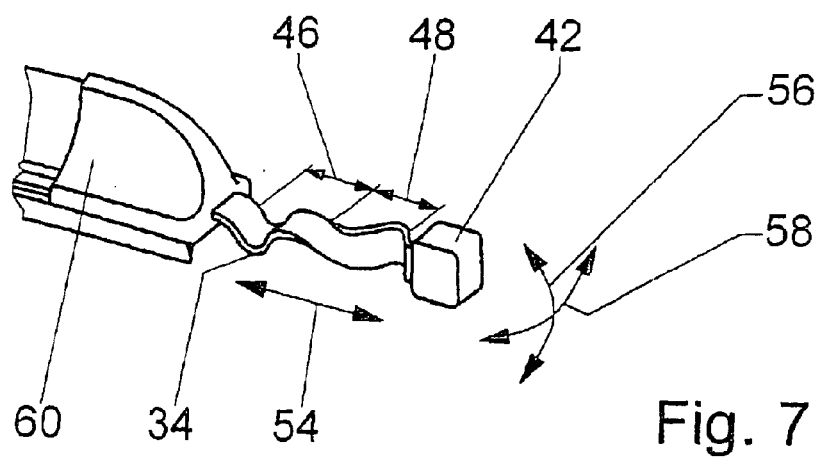

In the design according to FIG. 7, the connecting blade, 34, is limited in the undulated area, 40, so that a first area, 46, is produced in which the width of the connecting blade, 34, runs approximately parallel to the windshield, 26, while in a second area, 48, the width of the connector, 34, runs approximately perpendicular to the windshield, 26. This results in compensation in the longitudinal direction, 54, and in the direction, 56, perpendicular to the windshield 26 and in a direction, 58, perpendicular to the longitudinal direction, 54, and parallel to the windshield, 26.

Figure 8:
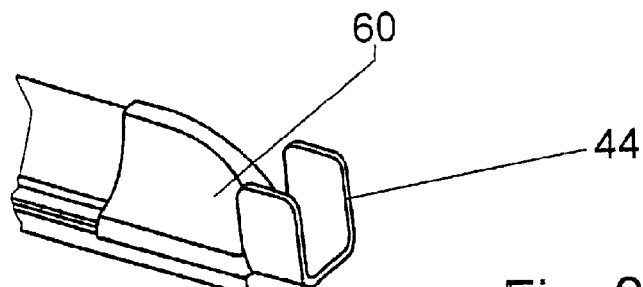
Figure 9:
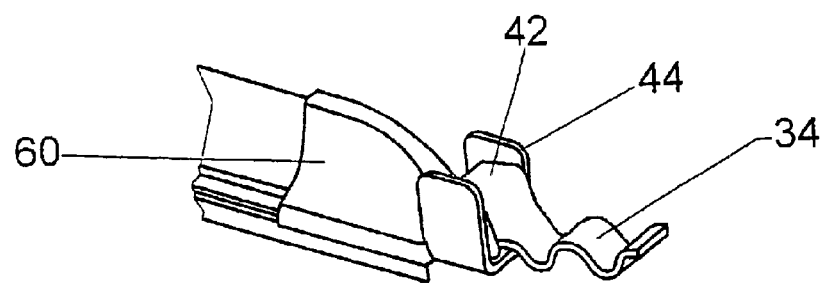
Figure 10:
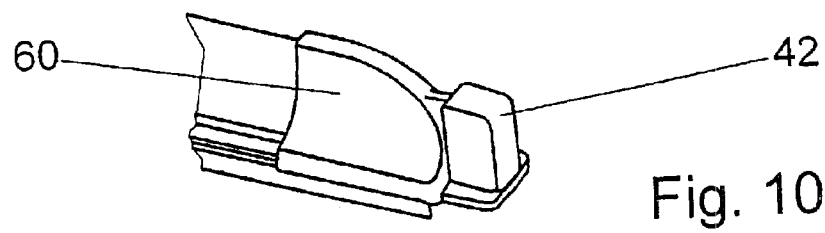
Figure 11:
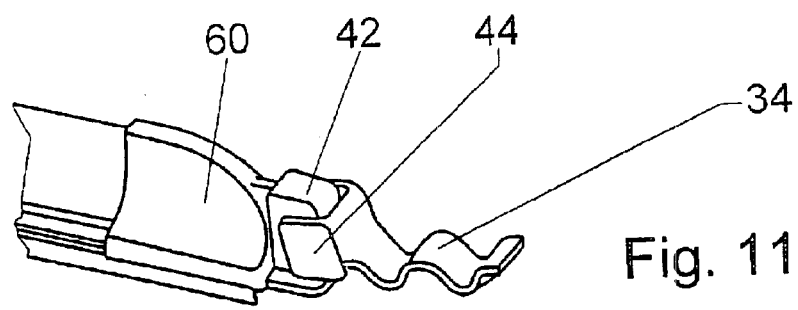

The designs according to FIGS. 8 through 11 show variations in which the connecting blade, 34, is connected with the cap, 60, via coupling elements, 42 and 44. The coupling element, 44, has a shoe-shaped form into which the coupling element, 42, in the shape of a rectangular parallelepipe is fitted. FIG. 8 and FIG. 9 show a design in which the shoe-shaped coupling element, 44, is formed on the cap, 60, while the rectangular parallelepipe-shaped coupling element, 42, is provided on the connecting blade, 34. FIG. 10 and FIG. 11 show the alternative, in which the rectangular parallelepipe-shaped coupling element, 42, is connected with the cap, 60, while the shoe-shaped coupling element, 44, is formed on the end of the connecting blade, 34, and grips around the coupling element, 42.

Figure 12:
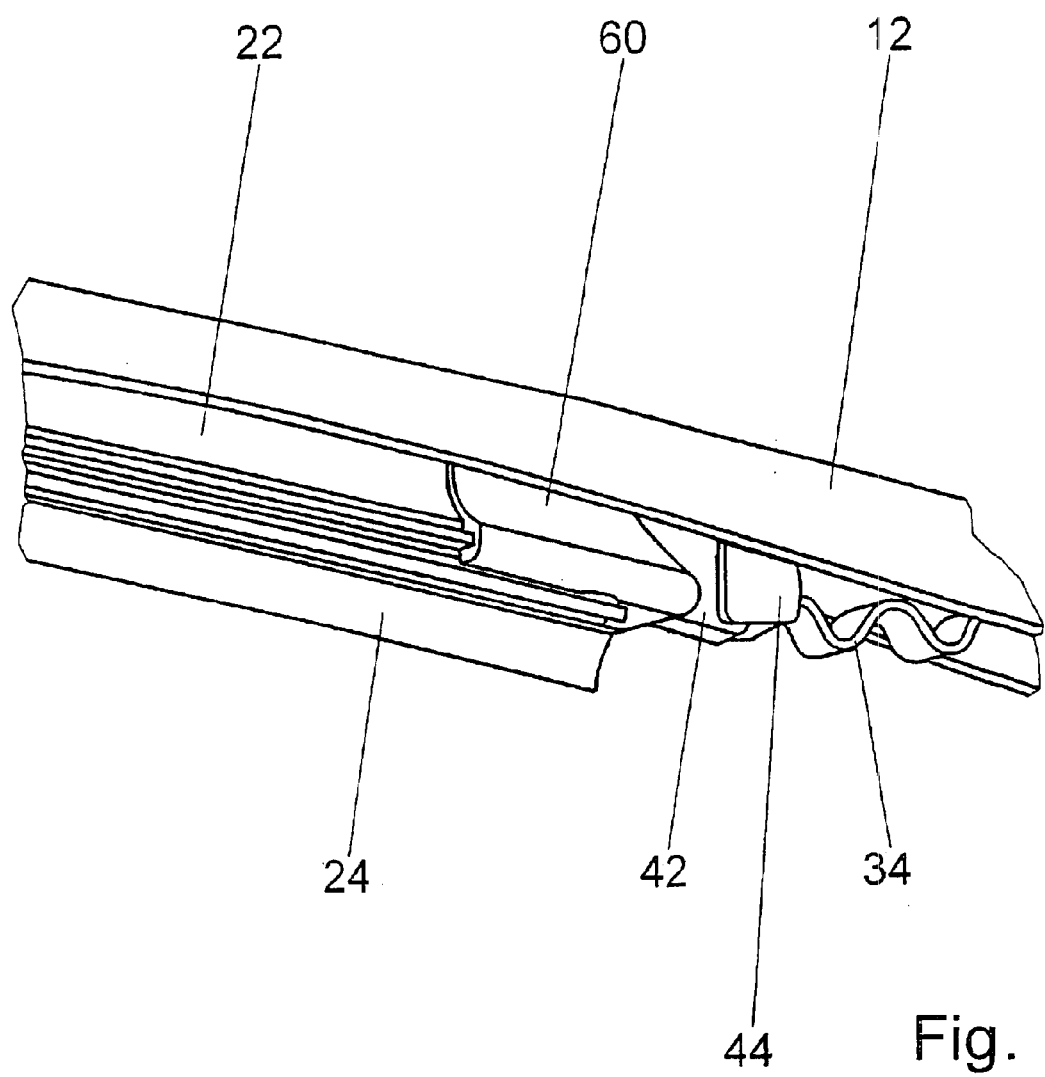

FIG. 12 shows a design according to FIGS. 10 and 11, along with an articulated part, 12, in a partial perspective view from below.

Figure 13:
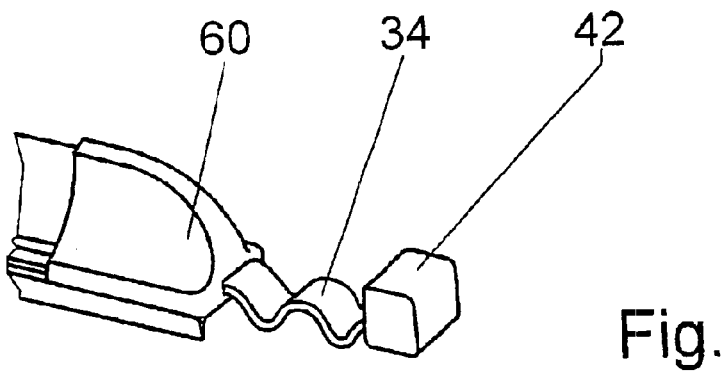
Figure 14:
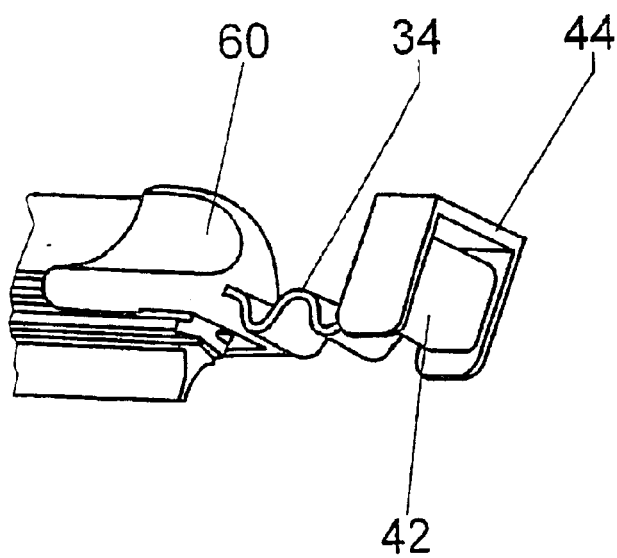
Figure 15:
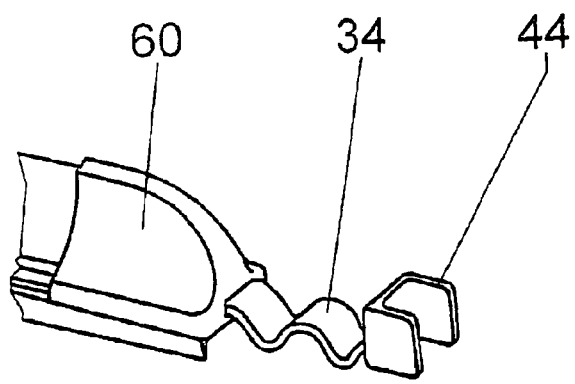
Figure 16:
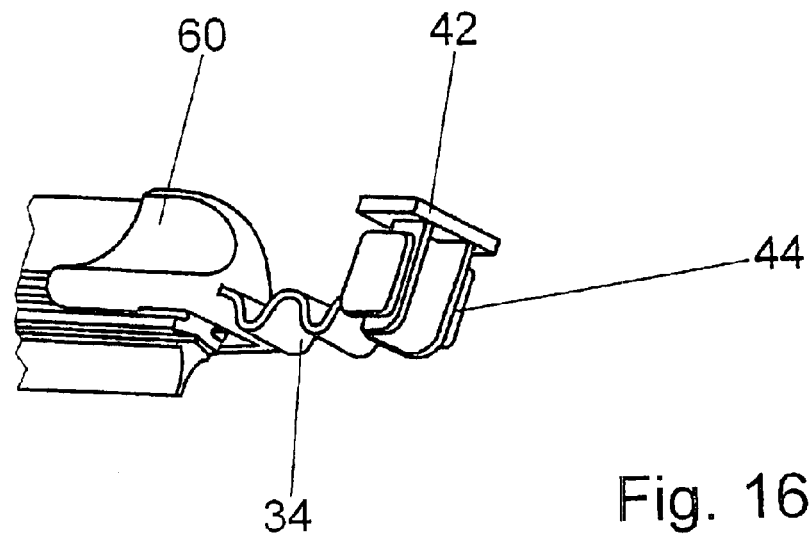

The designs, according to FIGS. 13 through 15, show a connecting blade, 34, whose second end, 32, is permanently connected to the cap, 60, and is connected to the articulation part, 12, via the coupling elements, 42 and 44, on the first end, 30. In the case of the design according to FIG. 13, the rectangular parallelepipe-shaped coupling element, 42, can be clamped directly in a U-shaped cross-sectional profile of the articulated part, 12, or, as FIG. 14 shows, in a shoe-shaped coupling element, 44, which is permanently connected to the articulated part, 12. In the design according to FIG. 15, a shoe-shaped coupling element, 44, is provided on the first end, 30, of the connecting blade, 34. This can also be clamped in the U-shaped profile of the articulated part, 12, or grip around a rectangular parallelepiped-shaped coupling element, 42, fastened to the wiper arm, 10 (FIG. 16).

Figure 17:
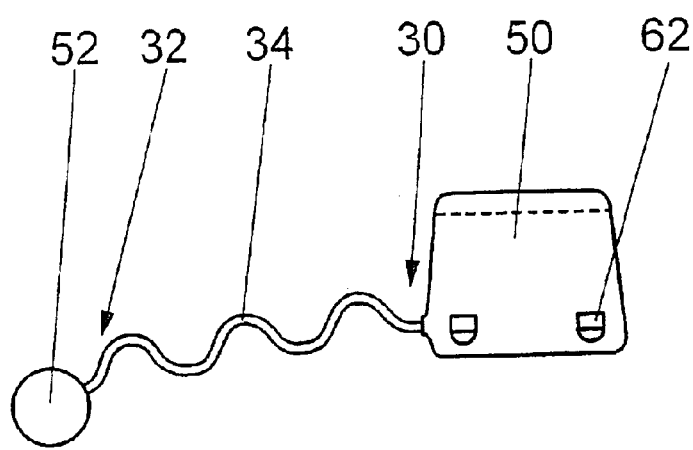

In the design according to FIG. 17, the connecting blade, 34, has a clip piece, 50, on its first end, 30, which can be pressed into the U-shaped profile of the articulated part, 12, and locked into corresponding indentations or recesses in the articulated part, 12, with noses, 62, or other suitable projections. The connecting blade, 34, has a coupling element, 52, in a spherical shape on the second end, 32, which forms a ball-and-socket joint with a corresponding counter piece as a coupling element (not depicted here in greater detail), through which angular deviations can be compensated.

What is claimed is:

1. A wiper arm (10) with a wiper blade (20) that is connected in an articulated manner, said wiper blade includes a wiper strip support (22) and wiper strip (24) and is laterally guided vis-à-vis the wiper arm (10) by a device (28) with an elogated elastic connecting blade (34), whereby the first end (30) of the connecting blade (34) is fixed on an articulated part (12) of the wiper arm (10), is characterized in that a second end (32) of the connecting blade (34) is fixed on the wiper blade (20) and the connecting blade (34) features an area (40, 46, 48) that is flexible in a longitudinal direction (54) along the connecting blade allowing longitudinal compensation along the length of the connecting blade.

2. A wiper arm (10), according to claim 1, is characterized in that the connecting blade (34) features an initial stress in the longitudinal direction (54) in an assembled state.

3. The wiper arm (10), according to claim 1, is characterized in that the connecting blade (34) is fabricated of spring steel.

4. The wiper arm (10), according to claim 1, is characterized in that the first end (30) is detachably fixed to the wiper arm (10).

5. The wiper arm (10), according to claim 4, is characterized in that the first end (30) of the connecting blade (34) bears a coupling element (42, 44), which is clamped between side cheeks (36) of the articulated part (12).

6. The wiper arm (10), according to claim 4, is characterized in that a coupling element (42, 44, 52) is fastened to or formed on the first end (30) of the connecting blade (34), whose coupling element cooperates with a corresponding coupling element (42, 44), which is connected to the articulated part (12).

7. Wiper arm (10) according to claim 6, characterized in that corresponding coupling elements (52) form a ball-and-socket joint.

8. The wiper arm (10), according to claim 1, is characterized in that a clip piece (50) is fastened to the first end (30) of the connecting blade (34), which can be locked into the corresponding openings or indentations of the articulated part (12) with noses (62).

9. The wiper blade (20), according to claim 1, is characterized in that the second end (32) of the connecting blade (34) is formed or cast on a cap (60) made of plastic on the end of the wiper blade support (22) or the wiper strip (24).

10. The wiper arm (10), according to claim 1, is characterized in that a coupling element (42, 44, 52) is fastened to or formed on the second end (32) of the connecting blade (34), whose coupling element cooperates with a corresponding coupling element (42, 44), which is connected to the wiper blade (20).

11. The wiper arm (10), according to claim 10, is characterized in that corresponding coupling elements (52) form a ball-and-socket joint.

12. The wiper blade (20), according to claim 1, is characterized in that the connecting blade (34) has at least one undulated area (40, 46, 48) transverse to the longitudinal direction (54).

13. The wiper blade (20), according to claim 12, is characterized in that the width of the connecting blade (34) in the undulated area (40, 46, 48) runs approximately parallel and/or perpendicular to the windshield (26).

* * * * *